(12) United States Patent
Thongrattana et al.

(10) Patent No.: US 9,157,817 B1
(45) Date of Patent: Oct. 13, 2015

(54) HSA SWAGE METROLOGY CALIBRATION USING SOLID WEIGHT GAUGE AND TORQUE SENSOR

(71) Applicant: Western Digital Technologies, Inc., Irvine, CA (US)

(72) Inventors: Chaiya Thongrattana, Bangkok (TH); Jetsada Nontree, Bangkok (TH); Teeraporn Srikwanjai, Nakornchaisri (TH); Piya Maneechote, Ayutthaya (TH); Chainat Krudpuek, Ayutthaya (TH); Wirat Khamon, Lopburi (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/299,714

(22) Filed: Jun. 9, 2014

(51) Int. Cl.
| | |
|---|---|
| *G01L 3/02* | (2006.01) |
| *G01L 3/04* | (2006.01) |
| *G11B 5/48* | (2006.01) |
| *G11B 5/40* | (2006.01) |

(52) U.S. Cl.
CPC ............... *G01L 3/04* (2013.01); *G11B 5/4813* (2013.01); *G11B 5/40* (2013.01)

(58) Field of Classification Search
CPC ........... B62D 6/10; G01L 3/104; G01L 5/221
USPC ........ 73/862.331–862.335, 862.325, 862.191
See application file for complete search history.

(56) References Cited

U.S. PATENT DOCUMENTS

| | | | |
|---|---|---|---|
| 5,793,634 A * | 8/1998 | Demarest et al. ............ 700/117 |
| 5,948,997 A * | 9/1999 | Schmidt ..................... 73/862.08 |
| 6,049,973 A | 4/2000 | Frank, Jr. et al. | |
| 6,225,799 B1 * | 5/2001 | Gergel et al. ................. 324/212 |
| 6,467,153 B2 | 10/2002 | Butts et al. | |
| 6,539,818 B1 * | 4/2003 | Verhey et al. ................ 73/865.9 |
| 6,585,256 B2 * | 7/2003 | Blackwell et al. ............ 271/150 |
| 6,651,192 B1 | 11/2003 | Viglione et al. | |
| 6,657,801 B1 | 12/2003 | Chue et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 7,003,626 B1 | 2/2006 | Chheda et al. | |
| 7,027,242 B1 | 4/2006 | Terrill et al. | |
| 7,046,467 B1 | 5/2006 | Chheda | |

(Continued)

*Primary Examiner* — Max Noori

(57) ABSTRACT

An assembly may comprise a head stack assembly (HSA) swaging tester device, comprising a base and a top tooling assembly connected thereto. The top tooling assembly may comprise an actuator motor; a load cell connected to the actuator motor; and a force gauge connected to the load cell, the force gauge being configured to measure torque imparted by the actuator motor on an HSA under manufacture. The force gauge of the HSA swaging tester device may be calibrated according to a selected type of HSA to undergo the swaging procedure by coupling a selected reference torque assembly to an axle connected to the actuator motor, the selected reference torque assembly being configured to impart a known torque onto the axle. The force gauge may then be adjusted (e.g., calibrated) according to the known torque imparted upon the axle by the selected reference torque assembly.

16 Claims, 6 Drawing Sheets

(56) References Cited

U.S. PATENT DOCUMENTS

| | | |
|---|---|---|
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,694,410 B2 * | 4/2010 | Kamigama et al. ........ 29/603.03 |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2013/0057986 A1 | 3/2013 | Vangal-Ramamurthy et al. |
| 2013/0248545 A1 | 9/2013 | Thongjitti et al. |

* cited by examiner

HSA SWAGE METROLOGY CALIBRATION USING SOLID WEIGHT GAUGE AND TORQUE SENSOR

BACKGROUND

Embodiments related to the manufacture of rotating media data storage devices. In particular, embodiments related to the manufacture and testing of components of magnetic hard disk drives.

DETAILED DESCRIPTION

Hard disk drives are critical data storage devices in modern computers. Structurally, a slider comprising read and write transducers is attached to the end of an HGA which is attached to an actuator arm to form a head stack assembly (HSA) through a ball swaging process. This process uses a stainless steel ball having a diameter that is wider than a corresponding boss and hole in a base plate of the HGA. As the ball is forced through the hole, the base plate expands and deforms. This deformation mechanically attaches the HGA to the actuator arm with a predetermined amount of contact pressure and retention torque.

Figure 1:
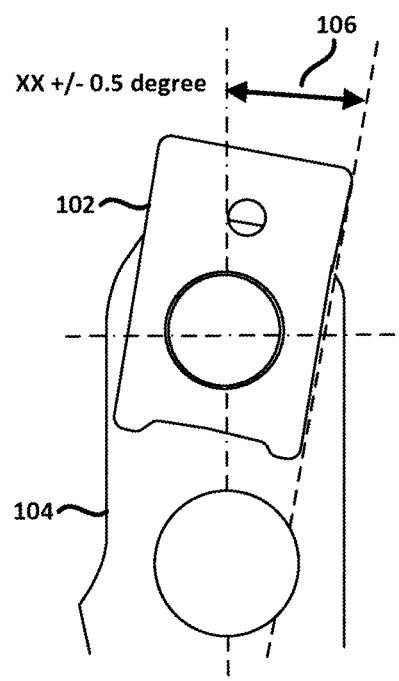
FIG. 1 shows aspects of a conventional head gimbal assembly (HGA) torque out test algorithm.

One method of determining swaged torque retention values is to test for rotational torque, as shown in FIG. 1. A torque meter is attached to the swage mount of the HGA base plate 102 and rotated until the swage mount is displaced, rotating the swage mount with respect to the actuator arm 104. The amount of ensuing displacement is related to the amount of contact pressure and retention torque. That is, a predetermined amount (e.g., angle 106) of rotation is observed for a given amount of torque imparted upon the swage mount. As long as the angle 106 is within acceptable limits, the swaging process is considered to have been carried out within acceptable tolerances.

The swage torque tester itself requires calibration to ensure that the swaging process is being carried out with the proper amount of contact pressure and retention torque. Conventionally, a hand torque gauge is used as a master to calibrate the swage torque tester. However, this method of swage torque metrology calibration using a hand torque gauge is not an accurate way to measure the performance of the swage torque tester. This is because, it has been observed, hand torque gauges are susceptible to significant variations in its torque measurement output (typically, about 6%), resulting in uncertainty of the readings. Moreover, conventionally, the ongoing monitoring of the tester's stability is carried out using sample HSA parts. This is problematic because sample parts are not actual parts and the value of the actuator arm—HGA retention force on an actual part is unknown. For these reasons, swage torque testers calibrated with a hand torque gauge cannot accurately and consistently represent or predict the performance of the swage torque tester on actual products. Indeed, due to the torque contributions of different parts of the swage torque tester and the variability of the hand torque gauge's output readings, there is an unacceptable uncertainty when attempting to determine whether the HGAs are adequately swaged onto the actuator arms so as to exhibit the desired swage torque retention characteristics.

To qualify the swage torque tester, a destructive Gauge Repeatability & Reproduce (GRR) may be performed using actual parts. However, this technique is believed to be inadequate to accurately characterize the performance of the swage torque tester, because the actual value of the swage torque retention in the part under test is itself unknown, which leads to further difficulties in manufacturing and assembly of parts across whole distributions of product specifications.

One embodiment comprises a systematic design for qualification and calibration of HSA swage metrology using a plurality of reference torque assemblies and a high-precision torque sensor. Indeed, one embodiment comprises reference torque assemblies comprising a removable rod of known length and a selected one of a plurality of different reference weights that may be used to generate known values of torque for performing GRR and system monitoring, thereby covering a whole distribution of HGA torque out specifications.

Figure 2A:
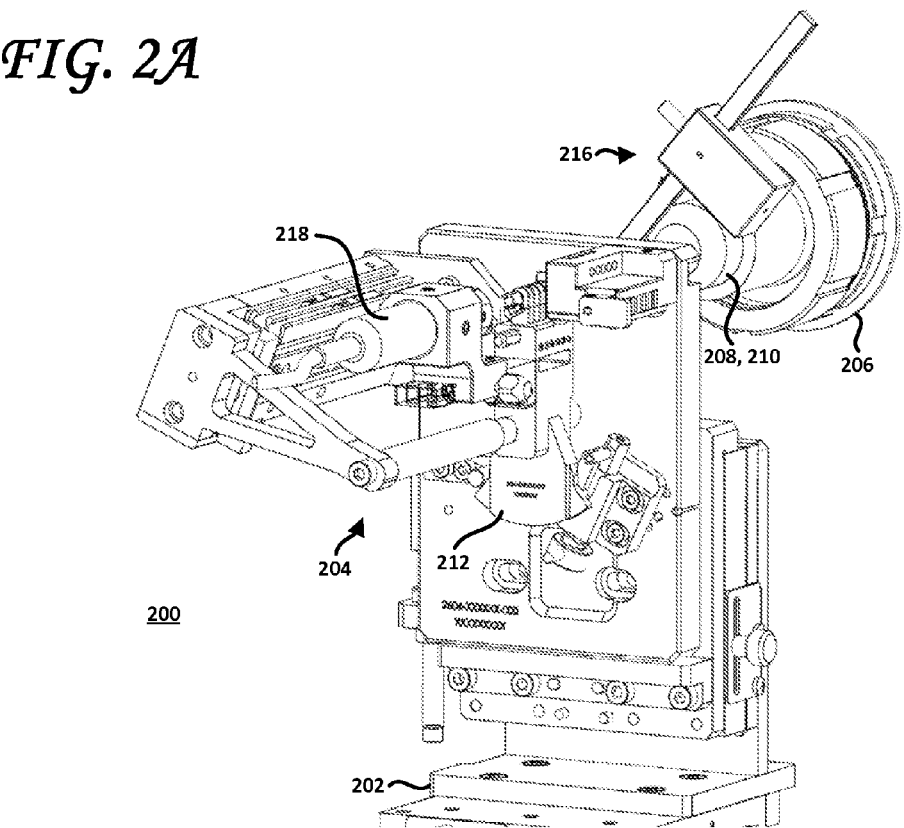
FIG. 2A shows an assembly according to one embodiment.
Figure 2B:
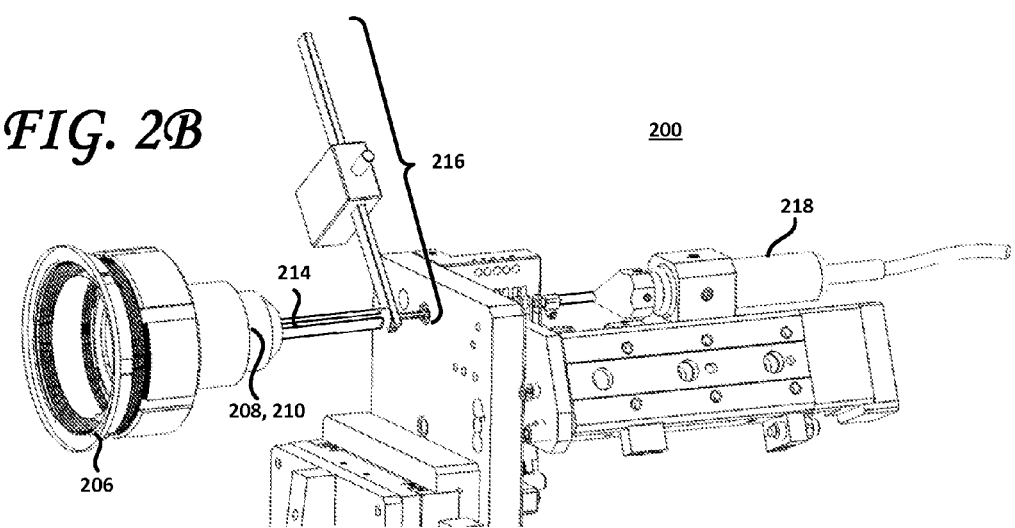
FIG. 2B shows another view of an assembly according to one embodiment.

Aspects of one embodiment are shown in FIGS. 2A and 2B. As shown therein, an assembly may comprise a HSA swaging tester device 200. The HSA swaging tester device 200 may comprise a base 202 and a top tooling assembly 204 connected to the base 202. The top tooling assembly 204 may comprise an actuator motor 206. A load cell 208 and a force gauge 210 may be connected to the actuator motor 206. The force gauge 210 is connected to the load cell 208 and may be configured to measure torque imparted by the actuator motor 206 on an HSA being manufactured during an HSA swaging procedure. In this manner, the HSA swaging tester device 200 may detect and measure the force imparted on the HSA during the HSA swaging or testing procedure. The present HSA swaging tester device 200 may be configured with the ability to communicate to an engineering control system and database to automate HSA swage test data recording and monitoring.

One embodiment enables the HSA swaging tester device 200 to be adjusted (e.g., calibrated) by imparting a known torque onto a dummy APFA, as shown at 212 in FIG. 2A. The actuator motor 206 may be coupled to the dummy APFA by an axle 214, as shown at 242 in FIG. 2B. According to one embodiment, the force gauge of the HSA swaging tester device 200 may calibrated according to a selected one of a plurality of types of HSAs to undergo the swage testing procedure. Indeed, different types of HSAs have different torque out requirements and the HSA swaging tester device should be calibrated differently according to which of the plurality of types of HSAs is to undergo swage testing.

Rather than coupling a hand torque gauge to the axle 214 coupled to the actuator motor 206 and the dummy actuator arms of the dummy APFA, one embodiment comprises coupling a selected one of a plurality of reference torque assemblies 216 to the axle 214, which extends through aligned openings in the respective actuator arms of the dummy APFA. According to one embodiment, each of the plurality of reference torque assemblies may be associated with a respective one of the plurality of types of HSAs to undergo the swaging testing procedure. Indeed, each of the plurality of reference torque assemblies 216 is configured to impart a known torque onto the axle, which known torque may be selected according to the type of HSA under test. The force gauge 210 may then be adjusted (e.g., calibrated, tared) according to the known torque imparted upon the axle 214 by the selected reference torque assembly 216. This known torque, imparted upon the axle 214, may be measured using a high precision torque sensor 218.

The high-precision torque sensor 218 may be configured with reference to the APFA dimensions and to integrate the torque sensor 218 into the swaging area of the HSA swaging tester device 200, and into the location of the base plate swage boss assembly. The high precision torque sensor 218 may be configured to be adjustable with torque values representing the whole distribution of swage torque specifications for every head position on the arm.

Figure 3A:
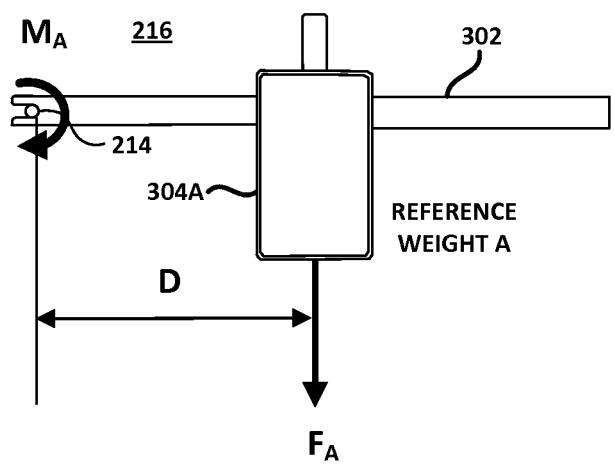
FIG. 3A shows further aspects of one embodiment.
Figure 3B:
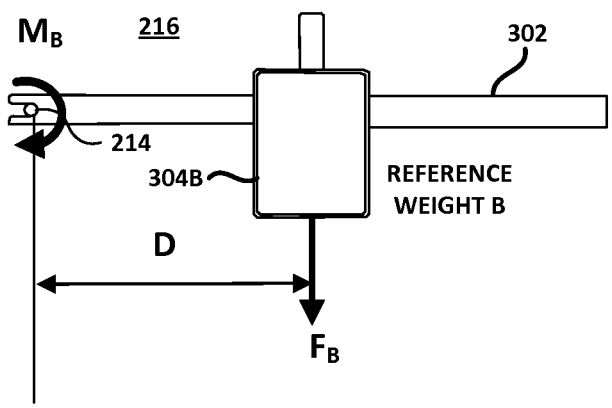
FIG. 3B shows further aspects of one embodiment.

FIGS. 3A and 3B illustrate the principle of operation of the reference torque assemblies 216. According to one embodiment, one or more of the plurality of the reference torque assemblies may be unitary (e.g., molded or assembled into a fixed assembly) device or may be a composite assembly. As shown in FIGS. 3A and 3B, a reference torque assembly, according to one embodiment, may comprise a rod 302 that is configured to couple to the axle 214 of the HSA swaging tester device 200. Connected to the rod 302 at a known distance D from an end thereof is a reference (known) weight (a static load). In FIG. 3A, the reference weight is a first reference weight $304_A$ and in FIG. 3B, the reference weight is a second reference weight $304_B$. In FIGS. 3A and 3B, the reference weight $304_A$ is shown to be greater than the reference weight $304_B$. Accordingly, the force vector $F_A$ exerted onto the rod 302 in FIG. 3A is greater than the force vector $F_B$ exerted onto the rod 302 in FIG. 3B. A plurality of such reference torque assemblies may be provided, each with different reference weights (thereby generating different torques), configured for use in conjunction with the calibration of HSA swaging tester device 200 for use with different types of HSAs having respective different torque out requirements.

From FIGS. 3A and 3B, therefore, the rod 302 acts as a lever arm and the axle 214 defines the axis about which the axle 214 is caused to rotate due to the force vector $F_A$, $F_B$. This tendency of the axle 214 to rotate about the axis defined by axle 214 under the influence of the force vector $F_A$, $F_B$ is called torque, moment or moment of force and is shown in FIGS. 3A and 3B as $M_A$ and $M_B$. Mathematically, $M_A = D \times F_A$ and $M_B = D \times F_B$, where the operator X is the cross product of the scalar D and the force vector $F_A$, $F_B$. The magnitude of torque $M_A$, $M_B$ depends on three quantities: the force $F_A$, $F_B$ applied, the length D of the lever arm, and the angle between the force vector $F_A$, $F_B$ and the lever arm. One embodiment maintains the aforementioned angle at 90 degrees (relative to the rod 302), although reference torque assemblies 216 may be configured with other angles.

Figure 4:
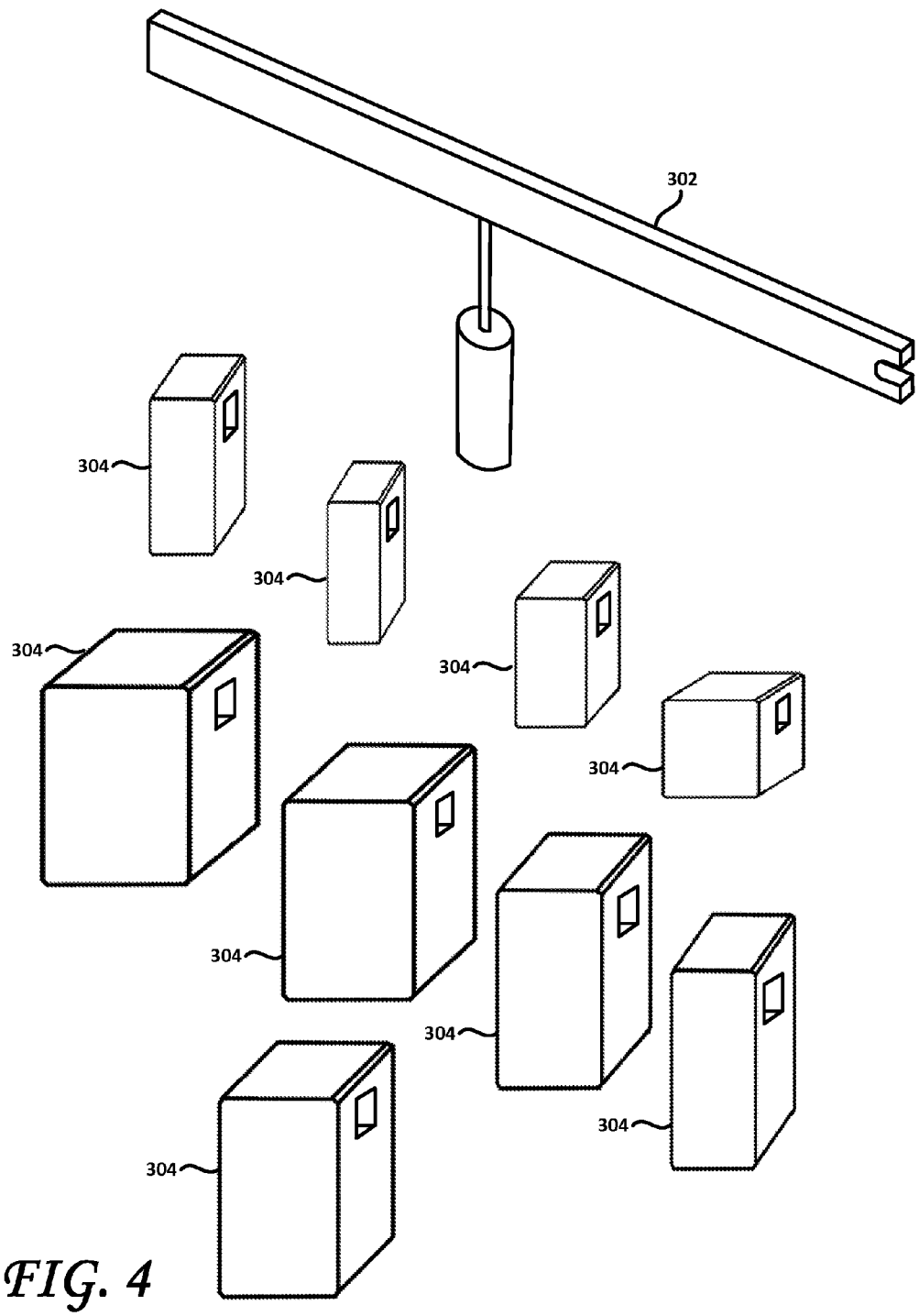
FIG. 4 shows one exemplary implementation of a reference torque assembly, according to one embodiment.

As noted above, the reference torque assemblies may be unitary in nature. According to one embodiment, one or more of the reference torque assemblies 216 shown herein may comprise a removable rod 302 configured to removably couple to axle 214 connected to the actuator motor 206 and a selected one of a plurality of different reference weights 304, as shown in FIG. 4. According to one embodiment, each of the plurality of different reference weights 304 may be associated with a respective one of the plurality of types of HSAs to undergo the swaging or testing procedure. In use, each of the plurality of different reference weights 304 is configured to removably couple to the removable rod 302 at a predetermined distance (such as distance "D" in FIGS. 3A and 3B) from an end thereof. The design of the reference weights 304 may be optimized for easy fabrication and for cost reduction. To maintain the length of the cantilever beam (rod 302) and the center of gravity of the reference torque assemblies, the reference weights 304 may be designed to have the same cross section for all gauges and different heights. Other configurations and shapes for the reference weights 304 and/or rods 302 are possible.

Figure 5:
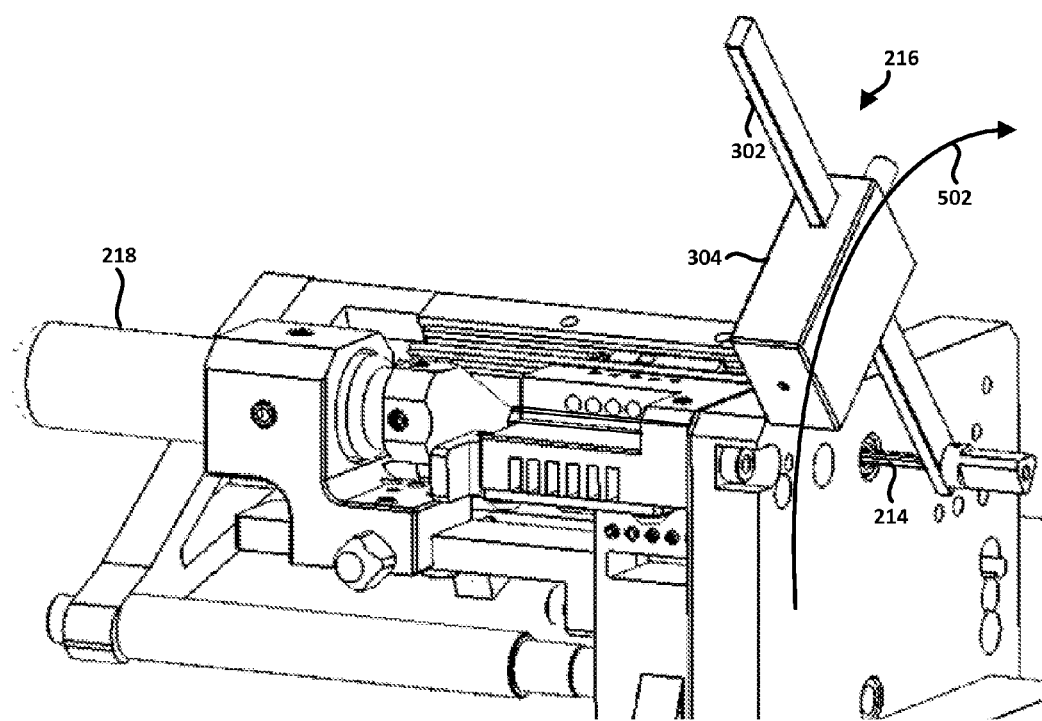
FIG. 5 is a perspective view of the calibration of a swage torque tester using a dummy actuator pivot flex assembly (APFA), according to one embodiment.

As shown in FIG. 5, the reference torque assemblies may be configured to be radially repositioned on the axle 214 connected the actuator motor to enable a re-calibration of the force gauge, with reference to the high precision torque sensor 218, at different radial positions.

One embodiment is a method for calibrating a swage torque tester. As disclosed above, such a method may comprise affixing a rod 302 of a known length to a torque sensor of a swage torque tester 200 and coupling a known weight 304 to the rod 302 such as to create a reference torque against which the swage torque tester 200 may be calibrated. The swage torque tester device 200 may then be adjusted until the output torque reading thereof substantially matches the reference torque applied by the reference torque assembly coupled to the rod 302.

Figure 6:
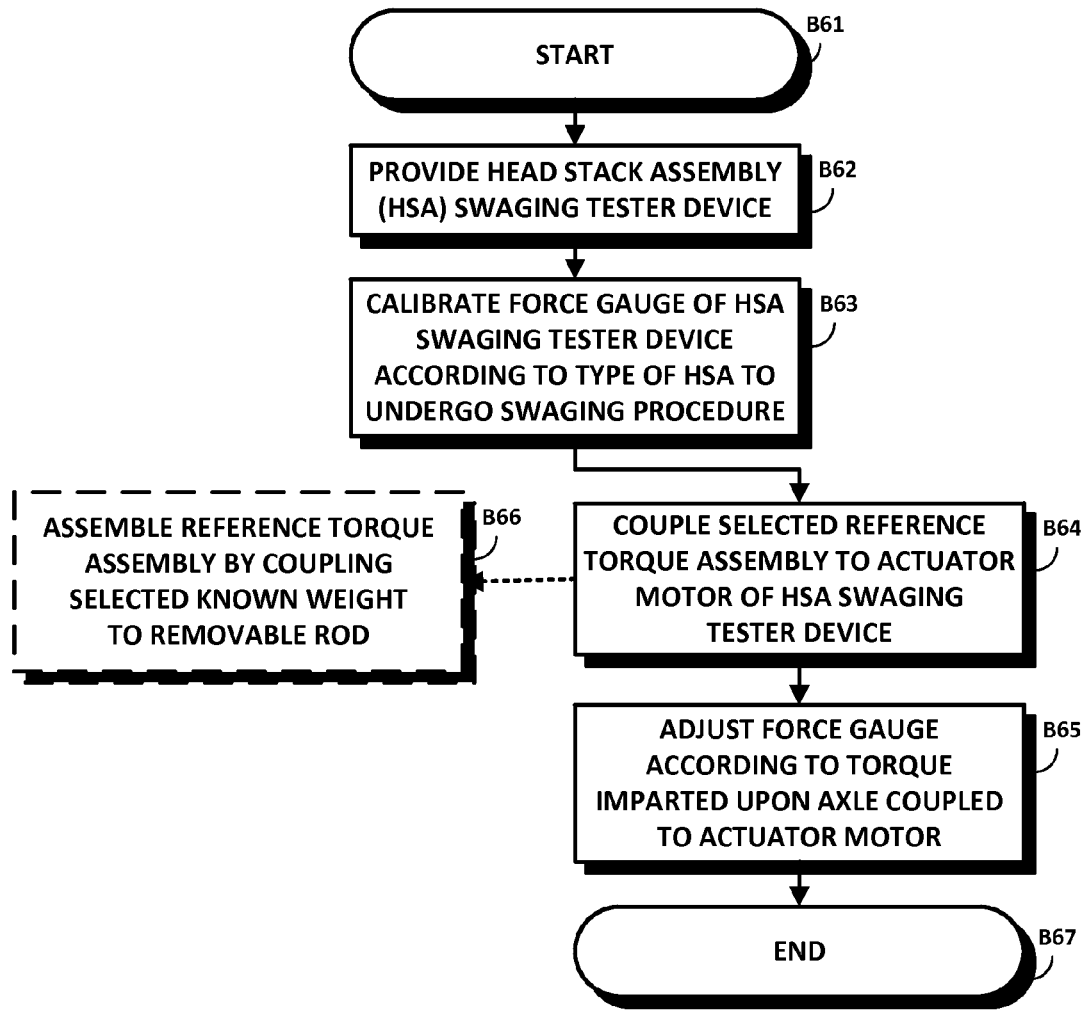
FIG. 6 is a flow chart of a method of calibrating a swage torque tester using a selected reference torque assembly, according to one embodiment.

FIG. 6 is a flowchart of a method according to one embodiment. As shown therein, the method may begin at B61, whereupon a HSA swaging tester device is provided, as shown at B62. According to one embodiment, the HSA swaging tester device (shown at 200 in FIGS. 2A, 2B and 5) may comprise a base 202, a top tooling assembly 204 connected to the base 202. The top tooling assembly 204 may comprise an actuator motor 206, a load cell 208 connected to the actuator motor 206 and a force gauge 210 connected to the load cell 208. The force gauge 210 may be configured to measure torque imparted by the actuator motor 206 on an HSA being manufactured during an HSA swaging procedure (or a previously-manufactured HSA). Block B63 calls for calibrating the force gauge according to a selected one of a plurality of types of HSAs to undergo the swaging or testing procedure. This may be carried out, according to one embodiment by coupling a selected one of a plurality of reference torque assemblies 216 to the axle 214 connected the actuator motor 206, which selected reference torque assembly 216 is configured to impart a known torque onto the axle 214, as shown at B64. Block B65 then calls for adjusting the force gauge according to the torque imparted upon the axle 214 by the selected reference torque assembly 216. The method ends at B67.

According to one embodiment, calibrating in Block B63 may comprise selecting one of the plurality of reference torque assemblies according to the selected type of HSA to undergo the swaging or testing procedure. As noted above, one or more of the plurality of reference torque assemblies may comprises a removable rod 302 configured to couple to an axle 214 connected to the actuator motor 206 and a selected one of a plurality of different reference weights 304. Each of the plurality of different reference weights may be associated with a respective one of the plurality of types of HSAs to undergo the swaging or testing procedure. Coupling, in Block B64, may comprise coupling the removable rod 302 to the axle 214 connected to the actuator motor 206 and coupling the selected reference weight 304 to the removable rod 302 at a known distance from an end thereof.

The method, according to one embodiment may also comprise removing the selected reference torque assembly 216 from the axle 214 coupled to the actuator motor 206, mounting an HSA of the selected type on the top tooling assembly 204 and carrying out the HSA swaging testing procedure on the mounted HSA with reference to the calibrated force gauge.

The method also encompasses re-adjusting or re-calibrating the HSA swaging tester device 200 by selecting another one of the plurality of reference torque assemblies 216 associated with a selected other one of the plurality of types of HSAs to undergo the swaging or testing procedure and coupling the selected reference torque assembly 216 to the axle 214 connected to the actuator motor 206. The force gauge may then be calibrated according to this selected other type of HSA to undergo the swaging or testing procedure by adjusting the force gauge according to the torque imparted upon the rod 302 by the selected other one of the plurality of reference torque assemblies 216.

The selected other reference torque assembly 216 may then be removed from the axle 214 coupled to the actuator motor 206, another HSA of another type may then be mounted on the top tooling assembly 204 and the HSA swaging or testing procedure may then be carried out on the mounted HSA with reference to the calibrated force gauge. Adjusting may be carried out with a dummy actuator pivot flex assembly (APFA) mounted to the top tooling assembly 204 (instead of, for example, a real HSA that would require destructive testing). The selected reference torque assembly 216 may then be radially re-positioned on the axle 214 connected the actuator motor 206 and the force gauge may be re-calibrated with the reference torque assembly 216 positioned at this new radial position on the axle 214.

Significantly, embodiments eliminate operator dependency and reduce the effect of material variation. The result is improved HSA mechanical yield and productivity. By improving the calibration, qualification and monitoring system of swage torque metrology, greater tester accuracy and efficiency is achieved.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. An assembly, comprising:
a head stack assembly (HSA) swaging tester device, the HSA swaging tester device comprising:
a base;
a top tooling assembly connected to the base, the top tooling assembly comprising:
an actuator motor;
a load cell connected to the actuator motor; and
a force gauge connected to the load cell, the force gauge being configured to measure torque imparted by the actuator motor on an HSA being manufactured during an HSA swaging procedure; and
a selected one of a plurality of reference torque assemblies;
wherein the force gauge of the HSA swaging tester device is configured to be calibrated according to a selected one of a plurality of types of HSAs to undergo the swaging procedure by:
coupling the selected one of the plurality of reference torque assemblies to an axle connected to the actuator motor, the selected reference torque assembly being configured to impart a known torque onto the axle; and
adjusting the force gauge according to the torque imparted upon the axle by the selected reference torque assembly.

2. The assembly of claim 1, wherein each of the plurality of reference torque assemblies is associated with a respective one of the plurality of types of HSAs to undergo the swaging procedure.

3. The assembly of claim 2, wherein at least one of the plurality of reference torque assemblies comprises a removable rod configured to couple to an axle connected to the actuator motor; and a selected one of a plurality of different reference weights, each of the plurality of different reference weights being associated with a respective one of the plurality of types of HSAs to undergo the swaging procedure.

4. The assembly of claim 3, wherein each of the plurality of different reference weights has a same cross-section and a different height.

5. The assembly of claim 3, wherein each of the plurality of different reference weights is configured to removably couple to the removable rod at a predetermined distance from an end thereof.

6. The assembly of claim 1, further comprising a dummy actuator pivot flex assembly mounted to the top tooling assembly.

7. The assembly of claim 1, wherein the selected one of a plurality of reference torque assemblies is configured to be radially repositioned on the axle connected the actuator motor to enable a re-calibration of the force gauge.

8. A method, comprising:
providing a head stack assembly (HSA) swaging tester device, the HSA swaging tester device comprising a base, a top tooling assembly connected to the base, the top tooling assembly comprising an actuator motor, a load cell connected to the actuator motor and a force gauge connected to the load cell, the force gauge being configured to measure torque imparted by the actuator motor on an HSA being manufactured during an HSA swaging procedure; and
calibrating the force gauge according to a selected one of a plurality of types of HSAs to undergo the swaging procedure by:
coupling a selected one of a plurality of reference torque assemblies to an axle connected the actuator motor, the selected reference torque assembly being configured to impart a known torque onto the axle; and
adjusting the force gauge according to the torque imparted upon the axle by the selected reference torque assembly.

9. The method of claim 8, wherein calibrating comprises selecting one of the plurality of reference torque assemblies according to the selected type of HSA to undergo the swaging procedure.

10. The method of claim 8, wherein at least one of the plurality of reference torque assemblies comprises a removable rod configured to couple to an axle connected to the actuator motor; and a selected one of a plurality of different reference weights, each of the plurality of different reference weights being associated with a respective one of the plurality of types of HSAs to undergo the swaging procedure, and wherein coupling comprises:
   coupling the removable rod to the axle connected to the actuator motor; and
   coupling the selected reference weight to the removable rod at a known distance from an end thereof.

11. The method of claim 10, wherein each of the plurality of different reference weights has a same cross-section and a different height.

12. The method of claim 8, further comprising:
   removing the selected reference torque assembly from the axle coupled to the actuator motor;
   mounting an HSA of the selected type on the top tooling assembly; and
   carrying out an HSA swaging testing procedure on the mounted HSA, with reference to the calibrated force gauge.

13. The method of claim 10, further comprising:
   selecting another one of the plurality of reference torque assemblies associated with a selected other one of the plurality of types of HSAs to undergo the swaging procedure;
   coupling the selected other one of the plurality of reference torque assemblies to the axle connected to the actuator motor; and
   calibrating the force gauge according to the selected other one of the plurality of types of HSAs to undergo the swaging procedure by:
   adjusting the force gauge according to the torque imparted upon the rod by the selected other one of the plurality of reference torque assemblies.

14. The method of claim 13, further comprising:
   removing the selected other one of the plurality of reference torque assemblies from the axle coupled to the actuator motor;
   mounting an HSA of the selected other type on the top tooling assembly; and
   carrying out the HSA swaging procedure on the mounted HSA with reference to the calibrated force gauge.

15. The method of claim 8, wherein adjusting is carried out with a dummy actuator pivot flex assembly mounted to the top tooling assembly.

16. The method of claim 8, further comprising radially re-positioning the selected one of a plurality of reference torque assemblies on the axle connected the actuator motor and re-calibrating the force gauge.

* * * * *